United States Patent
Jazayeri et al.

(10) Patent No.: US 8,477,350 B2
(45) Date of Patent: Jul. 2, 2013

(54) CLOUD-BASED PRINT SERVICE

(75) Inventors: Mike Jazayeri, New York, NY (US);
Randall R. Spangler, San Jose, CA (US); Sanjeev Radhakrishnan, San Jose, CA (US); Abhijit Kalamkar, Sunnyvale, CA (US); Marc Pawliger, San Jose, CA (US); Scott Byer, Cupertino, CA (US); Yevgeniy Gutnik, Cupertino, CA (US)

(73) Assignee: Google Inc., Mountain View, CA (US)

( * ) Notice: Subject to any disclaimer, the term of this patent is extended or adjusted under 35 U.S.C. 154(b) by 534 days.

(21) Appl. No.: 12/725,067

(22) Filed: Mar. 16, 2010

(65) Prior Publication Data
US 2011/0299110 A1 Dec. 8, 2011

(51) Int. Cl.
*G06F 15/00* (2006.01)
*G06F 3/12* (2006.01)

(52) U.S. Cl.
USPC .......................................... 358/1.15; 358/1.6

(58) Field of Classification Search
USPC .................... 358/1.15, 1.9, 523, 400, 401
See application file for complete search history.

(56) References Cited

U.S. PATENT DOCUMENTS

| | | | | |
|---|---|---|---|---|
| 5,828,864 | A * | 10/1998 | Danknick et al. | 703/24 |
| 6,453,129 | B1 * | 9/2002 | Simpson et al. | 399/23 |
| 7,092,119 | B1 * | 8/2006 | Hinds et al. | 358/1.9 |
| 7,411,690 | B2 * | 8/2008 | Tsukada | 358/1.15 |
| 2004/0114175 | A1 | 6/2004 | Cherry et al. | |
| 2005/0158100 | A1 * | 7/2005 | Yamaguchi et al. | 400/62 |
| 2006/0095500 | A1 * | 5/2006 | Kato | 709/201 |
| 2006/0158680 | A1 * | 7/2006 | Fujinawa et al. | 358/1.15 |
| 2007/0086054 | A1 * | 4/2007 | Ikeno | 358/1.16 |
| 2007/0159650 | A1 * | 7/2007 | Takamatsu et al. | 358/1.15 |
| 2007/0253020 | A1 * | 11/2007 | Hull et al. | 358/1.15 |
| 2008/0137121 | A1 * | 6/2008 | Chrisop et al. | 358/1.13 |
| 2009/0276266 | A1 * | 11/2009 | Nishiyama | 705/7 |
| 2010/0302579 | A1 * | 12/2010 | Nuggehalli et al. | 358/1.15 |
| 2010/0309508 | A1 * | 12/2010 | Kamath et al. | 358/1.15 |
| 2010/0328707 | A1 * | 12/2010 | Miyake | 358/1.15 |

(Continued)

FOREIGN PATENT DOCUMENTS

EP 1465052 A2 10/2004
WO 2011115987 A2 9/2011

OTHER PUBLICATIONS

"Server Message Block", from Wikipedia, the free encyclopedia, Aug. 24, 2012, 9 pages.

(Continued)

*Primary Examiner* — Jerome Grant, II

(57) ABSTRACT

A print server may include an application manager configured to receive a print request over a network from an application executing on a device, and configured to provide, over the network, a print dialog to a user of the application, the print dialog configured to provide for a selection of at least one printer associated with a user account of the user and thereafter receive a selected printer from the selection. A format converter may be configured to receive a print job designating the selected printer, the print job including print data and print characteristics expressed in a first format, and configured to convert the print job from the first format into a printer-specific format associated with the selected printer. A print job router may be configured to route the print job over the network from the print server to a print client associated with the selected printer, for printing by the selected printer, using the printer-specific format.

27 Claims, 6 Drawing Sheets

U.S. PATENT DOCUMENTS

| | | | |
|---|---|---|---|
| 2011/0075164 A1* | 3/2011 | Nordback | 358/1.9 |
| 2011/0096354 A1* | 4/2011 | Liu | 358/1.15 |
| 2011/0222104 A1* | 9/2011 | Mohammad et al. | 358/1.15 |
| 2011/0235085 A1 | 9/2011 | Jazayeri et al. | |
| 2011/0242554 A1* | 10/2011 | Farry et al. | 358/1.6 |
| 2011/0252071 A1 | 10/2011 | Cidon | |
| 2012/0057193 A1 | 3/2012 | Jazayeri | |

OTHER PUBLICATIONS

"CUPS", from Wikipedia, the free encyclopedia, Aug. 22, 2012, 10 pages.

"HP and RIM Announce Strategic Alliance to Mobilize Business on BlackBerry", Hewlett-Packard Development Company, L.P., May 4, 2009, 3 pages.

Ray, "HP Cloud Print: 100% and Absolutely Revolutionary", Aug. 21, 2007, 3 pages.

"Introducing ePrint", ePrintCenter, Hewlett-Packard Development Company, L.P., 2012, 1 page.

"Internet Printing Protocol". from Wikipedia, Dec. 29, 2011, 3 pages.

"Print Server", from Wikipedia, the free encyclopedia, Jul. 31, 2012, 2 pages.

Search Report and Written Opinion for International Application No. PCT/US2011/028512, mailed Jun. 9, 2011, 13 pages.

Bhatti, et al., "Cloud-Based Printing for Mobile Devices", Proceedings of the SPIE, vol. 7540, 2010, pp. 75400A-75400A-8.

Search Report and Written Opinion for International Application No. PCT/US2012/060413, mailed Mar. 13, 2013, 7 pages.

* cited by examiner

CLOUD-BASED PRINT SERVICE

TECHNICAL FIELD

This description relates to printing.

BACKGROUND

An ability to print within a computing environment generally ranges from desirable to indispensable. Conventional printers, and associated printing techniques, typically involve installation of a print driver within the context of an operating system or platform of an associated computer. The print driver is generally specific to the associated (type of) printer, and to the operating system, and enables applications running in the context of the operating system to communicate with (e.g., send print jobs to) the printer.

Thus, in an example user experience, an owner of a computer running a particular operating system purchases a printer, and then installs a version of the printer driver associated with the user's operating system onto the computer. In other example scenarios, a printer (i.e., associated printer driver) may be installed in the context of a network. In the latter scenario(s), it is possible to share the installed printer among multiple network users. For example, a local computer executing an application, operating system, and printer driver, may print from the application to a remote printer, using an intermediary print server. Somewhat similarly, an application may execute on a remote device, and the operating system and printer driver may be installed on the remote device, as well. Then, a user may experience or use the remotely-executing application at a local computer (e.g., in a remote desktop or other virtual computing environment), and may print to a local or remote printer which receives commands from the remotely-installed printer driver.

The above-referenced paradigm for printing generally uses, for each (type of) printer, a print driver for each operating system/platform from which printing may occur. Consequently, it may be difficult for printer manufacturers to generate and maintain such print drivers for all available operating systems/platforms, and, even to the extent to which printer manufacturers are successful in doing so, it may be difficult for individual and/or network users to be aware of, identify, obtain, or otherwise implement an appropriate driver(s) (or associated updates).

Further, it may occur that a particular operating system/platform does not support a particular print driver, or any print driver at all. For example, operating systems designed to run in resource-limited environments, such as mobile devices (e.g., netbooks or smartphones), may have limited or no resources to execute a print driver. As a result, it may be difficult or impossible for applications running on such devices, or running remotely for use on such devices, to print in a satisfactory manner.

Similarly, network applications (e.g., "web applications") exist in which an application executes on a remote server while being used by a user on a local machine, e.g., using a browser or other client-side user interface. Such applications allow users to benefit from the use thereof, without requiring local installation (and associated depletion of local hardware resources). Printing documents associated with such applications is typically problematic, and often requires an initial conversion of such documents into a standardized format (e.g., the portable document format, or ".pdf") before printing can proceed in a reliable or predictable fashion.

In short, conventional printers and printing paradigms often provide a fragmented, expensive, resource-intensive, potentially unpredictable user experience which is sub-optimal at best and unworkable at worst for many users.

SUMMARY

According to one general aspect, a print server may include instructions stored on a computer-readable medium, and the print server may include an application manager configured to receive a print request over a network from an application executing on a device, and configured to provide, over the network, a print dialog to a user of the application, the print dialog configured to provide for a selection of at least one printer associated with a user account of the user and thereafter receive a selected printer from the selection. The print server may include a format converter configured to receive a print job designating the selected printer, the print job including print data and print characteristics expressed in a first format, and configured to convert the print job from the first format into a printer-specific format associated with the selected printer, and a print job router configured to route the print job over the network from the print server to a print client associated with the selected printer, for printing by the selected printer, using the printer-specific format.

According to another general aspect, a computer-implemented method may include receiving, at a server, a print request over a network from an application executing on a device, determining, at the server, a user account associated with a user of the application, providing, over the network, a print dialog to the user in association with the application, the print dialog configured to provide for a selection of at least one printer associated with the user account, receiving, via the print dialog, a selected printer from the selection, receiving, at the server, a print job designating the selected printer, the print job including print data and print characteristics expressed in a first format, converting the print job from the first format into a printer-specific format associated with the selected printer, and routing the print job over the network from the server to a print client associated with the selected printer for printing by the selected printer, using the printer-specific format.

According to another general aspect, a computer program product may include a cloud print service that is tangibly embodied on a computer-readable medium and may include executable code that, when executed, is configured to cause a data processing apparatus to receive, at the cloud print service, a print request over a network from an application executing on a device, provide, over the network, a print dialog association with the application, the print dialog configured to provide for a selection of at least one printer, receive, via the print dialog, a selected printer from the selection, receive, at the cloud print service, a print job designating the selected printer, the print job including print data and print characteristics expressed in a first format, convert, using the cloud print service, the print job from the first format into a printer-specific format associated with the selected printer, and route the print job over the network from the cloud print service to a print client associated with the selected printer for printing by the selected printer, using the printer-specific format.

According to another general aspect, a cloud-aware printer may include a network access manager configured to execute communications over a network between the cloud-aware printer and a cloud print service being executed on a cloud print server, and a print client configured to execute a print job originating from an application executing on a device that is on the network, the print job being received from the cloud print service via the network access manager.

The details of one or more implementations are set forth in the accompanying drawings and the description below. Other features will be apparent from the description and drawings, and from the claims.

DETAILED DESCRIPTION

Figure 1:
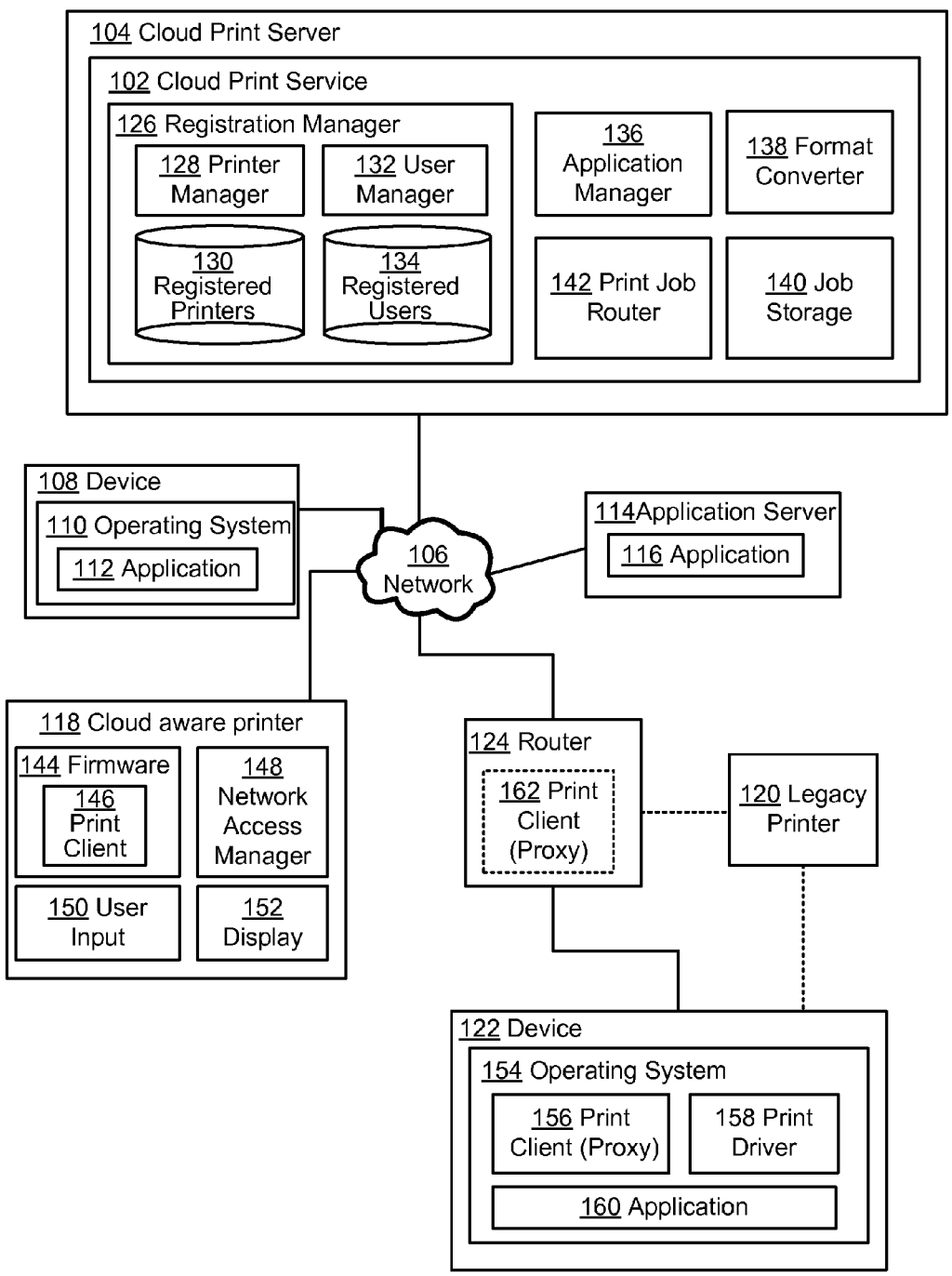
FIG. 1 is a block diagram of a system for implementing a cloud print service.

FIG. 1 is a block diagram of a system 100 for implementing a cloud print service 102. As shown in the example of FIG. 1, the cloud print service 102 may be executed on a cloud print server 104 which provides printing capabilities over a network 106. As described in detail below, the cloud print service 102 therefore provides a user with a uniform printing experience which is platform-independent and which unburdens the user of the need to configure, update, or otherwise maintain or oversee printer operations. Various other features and advantages of the cloud print service 102 are described in detail below, and/or would be apparent.

In FIG. 1, a device 108 is illustrated as an example of virtually any computing device from which a user may wish to execute a print job. By way of non-limiting example, then, the device 108 may include a laptop or desktop computer, a netbook, a tablet computer, a smartphone, a camera, or any device which may store or have access to data which the user may desire to print.

In the example of FIG. 1, an operating system 110 is illustrated as executing an application 112. Again, these elements are included by way of illustration and example, and may include virtually any operating system or other platform on which virtually any application may run. For example, the operating system 110 may include operating systems such as the Windows operating system, Mac OS, or Linux, and may include mobile platforms such as Android, Symbian, or iPhone OS, to name a few examples. In other examples, the operating system 110 may include a browser-based operating system, such as the Chrome OS.

Consequently, the application 112 may include virtually any application which may run on any underlying operating system or platform. Examples of such applications are well-known and too numerous to mention in any detail, but generally include document processing applications, email applications, image editing or presentation software, a web browser, or virtually any application which provides the user with a rendering of data which the user may wish to print.

In particular, as referenced above, the application 112 may represent a web application which executes on a remote application server 114 as application 116. That is, the application 116 may include any application functionality which is accessed by the user over the network 106 and experienced locally as the application 112, e.g., using a browser running at the device 108. As is known, such web applications allow an owner of the application server 114 to assume responsibility for installing, configuring, executing, and maintaining the application 116 at the application server 114, so that the user of the device 108 may obtain the benefit of the application 116 without many or any of the associated costs and responsibilities. Techniques for executing such a web application, and related technology, are well known in the art and are therefore not described further in detail herein, except as may be helpful or necessary to understand operations of the system 100 of FIG. 1.

The network 106 may thus represent, for example, the public Internet or other wide area public or private network. The network 106 may represent, in further examples, a corporate or other intranet, and/or a smaller-scale, local or personal network, any of which may be implemented using standard network technology.

Further in FIG. 1, a cloud-aware printer 118 is illustrated which is configured to communicate with the cloud print service 102 over the network 106. In this regard, the term "cloud" or "cloud-aware" references the use of "cloud computing," which, generally speaking, includes a style of computing in which computing resources such as application programs and file storage are remotely provided over a network such as the Internet, typically through a web browser. For example, many web browsers are capable of running applications, which can themselves be application programming interfaces ("API's") to more sophisticated applications running on remote servers. In the cloud computing paradigm, a web browser interfaces with and controls an application program that is running on a remote server. Through the browser, the user can create, edit, save and delete files on the remote server via the remote application program. Thus, it may be observed that the application server 114 and associated application 116 may also represent examples of cloud computing.

In the context of the cloud-aware printer 118, the cloud print service 102 enables the application 112 to print directly to the cloud-aware printer 118, without a requirement or need for (e.g., independently of), involvement of the operating system 110. In other words, the application 112 may communicate directly with the cloud print service 102 to thereby print to the cloud-aware printer 118, without e.g., requiring a local driver within the operating system 110. As a result, virtually any application 112 that may be configured to communicate with the cloud print service 118 may make use of the cloud-aware printer 118, as described in detail, below.

For example, the cloud print service 102 may be configured to register the user and/or the device 108, as well as the cloud-aware printer 118. In a specific example, the device may be a smartphone, and the user may use the application 112 to purchase a ticket (e.g., a movie ticket, or an airline ticket). Then, the user may print the purchased ticket directly to the cloud-aware printer 118, even though the device 108 and/or the operating system 110 may not have the resources, or otherwise be configured, to support native printing in a conventional sense (e.g., may not currently be executing a print driver of any sort associated with the cloud-aware printer 118). In this way, the user of the application 112 may be provided with a print option and associated abilities that are not currently provided in conventional printing paradigms and techniques. Many other such examples are described herein, or would be apparent.

The cloud-aware printer 118 may be contrasted with a legacy printer 120, which does not natively support communication with the cloud print service 102. Therefore, to illustrate additional or alternative examples of implementations of the system 100 of FIG. 1, a separate device 122 is illustrated, which, as described below, may be modified to impart the advantages of the cloud print service 102 to the legacy printer 120. Similarly, a router 124 may additionally or alternatively be modified to thereby enable the legacy printer 120 to participate in the cloud printing paradigm defined by the operations of the cloud print service 102, as described in detail below.

In short, the system 100 provides an ability for virtually any application running on any device within the network 106 (e.g., the applications 112, 116 and devices 108, 120) to communicate with the cloud print service 102 to thereby print to any printer which is also in (direct or indirect) communication with the cloud print service 102. Consequently, users may benefit from increased printing options and abilities, and experience an overall decrease in the costs and efforts associated with doing so. Meanwhile, printer manufacturers may experience a decreased or eliminated need to provide users with the (updated) driver(s) and other prerequisites for users to fully experience the benefits of their products. This may result in, for example, higher customer satisfaction, and a decreased cost of producing and maintaining printers.

In more detail, the cloud print service 102 includes a registration manager 126, which may be configured to register printers and users. As shown, then, a printer manager 128 may be configured to receive a registration of the cloud-aware printer 118 and/or the legacy printer 120, including storing identification information therefore within a data store 130 of registered printers. Similarly, a user manager 132 may be configured to register a user(s) who may currently or potentially wish to execute print jobs using the cloud print service 102, and to store identification information for such users within a data store 134 of registered users.

There are many example scenarios and techniques by which users and/or printers may come to be registered with the cloud print service 102 through the registration manager 126, many of which are described below in detail, e.g., with respect to FIG. 3A. In general, for example, a user of the device 108 may use a browser to visit a website associated with the cloud print service 102, and may enter a username/password combination to establish a user account with the print service.

In other examples, such users already may have a user account with a separate and possibly related service or service provider. For example, various online services (e.g., other cloud-based computing resources) may provide functionality such as email, data storage, and document processing, and, in such cases, a user already may have a secure user account established in connection therewith. In such cases, the cloud print service 102 may leverage or access such existing user accounts, e.g., to avoid a need to create a new user account, and to facilitate access of existing users of other services with the cloud print service.

Consequently, it may be appreciated that although the user manager 132 and registered users data store 134 are illustrated as being within the cloud print service 102, it also may occur that related functionality exists externally to the cloud print service, and is accessed thereby. For example, the application server 114 may provide an email application as the application 116, and a user of the device 108 may be registered with this email application (service). In such a case, the application server 114 may have the responsibility of maintaining the user's account, and the cloud print service 102 may simply interface with the application server 114 and provide access to the user once the user is logged into the application 116.

Techniques for registering users, maintaining user accounts, and maintaining security of users' accounts, are well-known in the art, and are not necessarily described here in detail, except as may be necessary or helpful to understand operations of the system 100, or related systems.

Meanwhile, the printer manager 128, as referenced above, is responsible for registering the cloud-aware printer 118, the legacy printer 120, and/or any printer which may interface with the cloud print service 102 and which may currently or potentially be accessed by a user of the cloud print service. As also referenced above, specific techniques for, and example of, printer registration are provided below with respect to FIG. 3A.

An application manager 136 may be configured to communicate with any application which may be desired to be used for printing within the system 100, including, e.g., the application 112, and the application 116. Thus, for example, the application manager 136 may implement various application programming interfaces (APIs) which enable such communication with external applications.

Specific examples of operations of the application manager 136 are provided below, e.g., with respect to FIGS. 3B and 4. In general, though, the application manager 136 may include the functions of receiving a print request, and then receiving an actual print job, from, e.g., the application 112. In general, the first function of receiving a print request may include providing the user of the application 112 (directly or indirectly) with a print dialog or other user interface with which the user may select an available/associated registered printer. Receiving the print job may include receiving print data to be printed, along with print characteristics characterizing preferences and other aspects of how the print data is desired to be printed (e.g., color vs. black-and-white, paper size, orientation, number of copies, or any other relevant or desired print characteristic). The application manager 136 may conduct other communications with the application 112, as well, such as, e.g., providing a status of a printer or print job.

The application manager 136 may communicate with the application 112 (or other application) in a format that is independent of a specific printer, e.g., that is generic with respect to all available or relevant printers within the system 100. In this way, the application 112 is relieved of some or all of the burdens associated with needing knowledge of a destination printer when formulating and/or sending the print job.

For example, with reference to the print job just described, the application 112 may formulate both the print data and print characteristics in the same manner, regardless of whether the print job is destined for, e.g., the cloud-aware printer 118 or the legacy printer 120. In fact, even if the user of the application 112 does not currently have any registered printer associated with his or her user account, the print job still may be forwarded to the cloud print service 102 for storage, and later printed to whatever printer is ultimately registered with the cloud print service 102 and the user's account.

Consequently, the application 112 may include or use, or be associated with, APIs to communicate with the application manager 136, where such APIs may be light-weight, consistent, customizable, and easy to implement within or among various applications. Moreover, such APIs may rarely, if ever, need to be updated or maintained by the user in order for the user print from the application using the cloud print service 102. Instead, such updates may be managed by an administrator or other provider of the cloud print service 102 and/or by a provider of the application 112, so that the user of the application 112 is unburdened of associated efforts and responsibilities. Even as new printers are introduced into the marketplace over time, the user may have the experience that the application 112 is able to utilize the new printer(s) simply by way of registration of the new printers with the cloud print service 102, as described in detail, below.

Print jobs received at the application manager 136 in the printer-independent or generic format may be passed to a format converter 138, which may be configured to receive a print job from the application manager 136 and facilitate or execute conversion of the print job into a format associated with the designated (type of) printer for the print job in question. Such conversion may thus generally include, as needed, conversion of the print data itself, as well as conversion of the print characteristics specified within a given print job.

For example, printers generally require low-level, device or type-specific instructions which provide a basis by which printers actually apply ink to paper to achieve a desired appearance. Such instructions therefore may include very specific portrayal of the desired print outcome, using, e.g., a Page Description Language (PDL). For example, the language PostScript may be used to describe a desired print outcome, and then rendered (e.g., rasterized) by a specific printer to generate printed text or images. Additionally, fixed-layout document formats exist which are designed to facilitate device-independent printing while maintaining document fidelity. For example, the portable document format (.pdf) is an example of such a format, where .pdf documents may be generated using PostScript. Somewhat similarly, the XML Paper Specification (XPS) provides such a fixed-layout document format, which is based on the eXtensible Markup Language (XML).

Print data may be received from the application 112 in virtually any format, including, e.g., Hypertext Markup Language (HTML), or in a format associated with document processing and/or images (e.g., .jpeg), or in the PDF or XPS formats referenced above. The format converter 138 may thus be configured to receive print data in these and other various formats and convert the print data into a format that is recognizable by a designated printer.

Similarly, the format converter 138 may be configured to convert the print characteristics associated with the print job into a format that is recognizable by the designated printer. That is, as referenced above, the print characteristics may include aspects of how the print data should or can be printed; i.e., based on preferences of the user and/or on capabilities (or lack thereof) of the designated printer(s). For example, the legacy printer 120 may be a black-and-white printer with no two-sided printing abilities, while the cloud-aware printer 118 may be a color printer with two-sided printing. The format converter 138 may then provide conversion, accordingly, depending on a selected printer.

The format converter 138 may provide and execute the resulting, converted print job using, e.g., a protocol referred to herein as a cloud print protocol (CPP). Thus, the cloud print protocol allows the cloud print service to communicate with the cloud-aware printer 118 or the legacy printer 120. Further detail and other aspects of the cloud print protocol are described in more detail, below.

The converted print job may be stored in a data store 140, illustrated as job store 140 in FIG. 1. Although illustrated separately in FIG. 1 for the sake of clarity and description, it may be appreciated that the job store 140 may overlap or coincide with the data stores 130, 134 of the registration manager 126. That is, for example, print jobs of a given user may be stored in conjunction with the user account of the user, and in conjunction with one or more printers registered to that user. As a result, print jobs may be committed to long-term storage, so that, for example, users may locate, identify, and re-print desired print jobs, even if the user later accesses the cloud print service 102 from a different device than was used to originally send a given print job.

Thus, it may be observed that conversion of the print job at least partially occurs at a separate device(s) (e.g., the cloud print server 104, the cloud-aware printer 118, the device 122, or the router 124) from the device(s) on which the originating application is executing (e.g., the device 108, the application server 114, or the device 122). In this way, for example, it is possible to formulate and submit a print job at least partially separately from a conversion of the print job into a printer-specific format, and to thereby divorce such conversion from an underlying operating system of the executing application.

A print job router 142 may be configured to route the converted print job to a designated printer, and otherwise monitor and mediate execution and success/failure of the print job. The print job router 142 may thus be responsible for managing and monitoring on-going print jobs from a plurality of users which are designated for a corresponding plurality of printers, as described in detail, below.

In so doing, the print job router 142 may be configured to execute, e.g., with a print client 146 executing on firmware 144 of the cloud-aware printer 118. The print client 146 may communicate with the cloud print service 102, e.g., with the print job router 142 and/or the registration manager 126, using the cloud print protocol referenced above.

More specifically, the print client 146 may be configured to register the cloud-aware printer 118 with the cloud print service 102, and to thereby associate the thus-registered printer 118 with a user of the device 108. Moreover, the print client 146 may be configured to actually drive the cloud-aware printer 118 and thereby execute the desired printing.

In the example of FIG. 1, the cloud-aware printer 118 is illustrated as including the print client 146 within the firmware 144. The firmware 144, as would be appreciated by one of skill in the art, may represent factory-installed hardware and/or software which provides designated functions without generally requiring or allowing user modification or configuration (e.g., may utilize read-only memory). Thus, the cloud-aware printer 118 may be pre-configured from before a time of purchase to communicate and coordinate with the cloud print service 102, to thereby provide a convenient and enjoyable user experience.

For example, the cloud aware printer 118 may include a network access manager 148, user input 150, and a display (or other user output) 152, which may generally represent conventional components that are not described here in detail except as needed to assist in understanding the operation of the system 100. Of course, the cloud-aware printer 118 also may include other conventional components, which are not discussed here for the sake or clarity and conciseness.

The network access manager 148 may represent associated hardware and/or software which enables the cloud-aware printer 118 to communicate over the network 106 with the cloud print service 102. For example, such communication may be conducted wirelessly if the cloud-aware printer 118 is within range of an appropriate wireless network. In other examples, the network access manager 148 may enable a wired connection of the cloud-aware printer 118 to the network 106, e.g., by way of connection to a router such as the router 124.

The user input 150 may represent virtually any sort of keypad, stylus, or other techniques for entering data to the cloud-aware printer 118. Similarly, the display 152 may represent virtually any sort of audio and/or video display to output information to a user of the cloud-aware printer 118.

In example scenarios, then, a user may purchase the cloud-aware printer 118. Upon powering, the cloud-aware printer 118 may automatically output or identify the cloud print service 102, e.g., by printing a URL or other identifier on paper loaded in a paper tray of the cloud-aware printer 118, or by displaying such information using the display 152. Similarly, the cloud-aware printer 118 may output registration information for itself, e.g., a serial number or other unique identifier.

Then, in one example scenario, the purchaser may use the device 108 or other network device to communicate with the cloud print service 102, e.g., by using a browser to visit a website of the cloud print service 102 provided by the cloud print server 104. The user/purchaser may then log into his or her user account associated with the cloud print service 102 and be prompted to enter the registration information for the cloud-aware printer 118.

In other example implementations, the user input 150 and display 152 may similarly be used to communicate directly with the cloud print service 102 using the network access manager 148. For example, upon powering, the cloud-aware printer 118 may automatically connect to the cloud print service 102 using the print client 146 and the network access manager 148, and then use the display 152 to prompt the user/purchaser to login to the cloud print service 102, to thereby automatically associate the cloud-aware printer 118 as being registered to the user/purchaser.

In contrast, the legacy printer 120 may not be manufactured to include the print client 146 and/or other components of the cloud-aware printer 118. For example, the legacy printer 120 may have been manufactured prior to an availability of the cloud print service 102, or simply may have been made without the necessary components to communicate with the cloud print service 102.

In such a case, the legacy printer 120 may be connected in a conventional way to the device 122 (e.g., by USB or other suitable wired or wireless connection). For example, the device 122 may include an operating system 154, which may be used to host a print client 156 which is conceptually similar to the print client 146, and which serves as a proxy for the legacy printer 120 to thereby allow the legacy printer 120 to participate in the system 100.

In some implementations, the print client/proxy 156 may communicate directly with the legacy printer 120 to execute a print job from the cloud print service 102. In other implementations, the operating system 154 may have a conventional printer driver 158 installed for the legacy printer 120, in which case the system 100 may leverage some or all of the functionality of the print driver 158 to drive the legacy printer 120.

Thus, in operation, the print client/proxy 156 may be configured to register the legacy printer 120 with the registration manager 126 (printer manager 128) of the cloud print service 102, in a similar manner(s) as described above and depending on a presence or absence of capabilities of the legacy printer 120 (e.g., whether the legacy printer 120 includes network access, user input and/or display components).

Once registered, an application 160 which may desire to print to the legacy printer 120 may communicate a print job to the cloud print service 102, e.g., in the manner described above with respect to the application 112. As the legacy printer 120 is thus incorporated and integrated into the system 100, it may be appreciated that the application 112 and/or the application 116 may thus print to the legacy printer 120, as easily as to the cloud-aware printer 118. For example, a user of the device 108 may use the application 112 to execute a print job to the legacy printer 120, even if the legacy printer 120 is remote from the device 108 over the network at the time of the printing.

Similarly, a print client 162 may be installed as a proxy component on the router 124, as an addition or alternative to the print client 156, to integrate the legacy printer 120 into the system 100. The print client (proxy) 162 may thus similarly allow for registration of the legacy printer 120 with the cloud print service 102 and with one or more users (e.g., of the device 108 and/or the device 122), and may accept print jobs from the cloud print service 102 which are designated for the legacy printer 120.

Many features and advantages are provided by the system 100 and variations thereof, as referenced herein and/or as would be apparent to one of skill in the art. For example, as described, the system 100 facilitates remote printing in a straight-forward and easily implementable fashion, because a user need only log in to the cloud print service 102 and register a printer using any device (e.g., personal computer, smartphone or other mobile device, or a printer itself). Then, the user can thereafter login to the cloud print service 102 from any device, anywhere on the network 106, and send a print job to the thus-registered printer from any compatible application, even if the device and printer are remote from one another.

In other example implementations, it is possible to share printers between different users. For example, techniques currently exist for sharing documents in existing cloud-based document processing/management systems, such as when a first user sends an email to a second user with a link to a document to be shared. With the system 100, such techniques and concepts can be extended to the realm of printing. For example, the first user may send a link referencing a printer to be shared (e.g., referencing or including registration information for the printer), so that the second, receiving user may simply follow the link to associate the identified printer with the second user's cloud print service user account. In these and other scenarios, users may, e.g., print documents directly to a receiving user, or print work documents to a home printer (or vice versa), and otherwise experience the benefits of remote printing.

Figure 2:
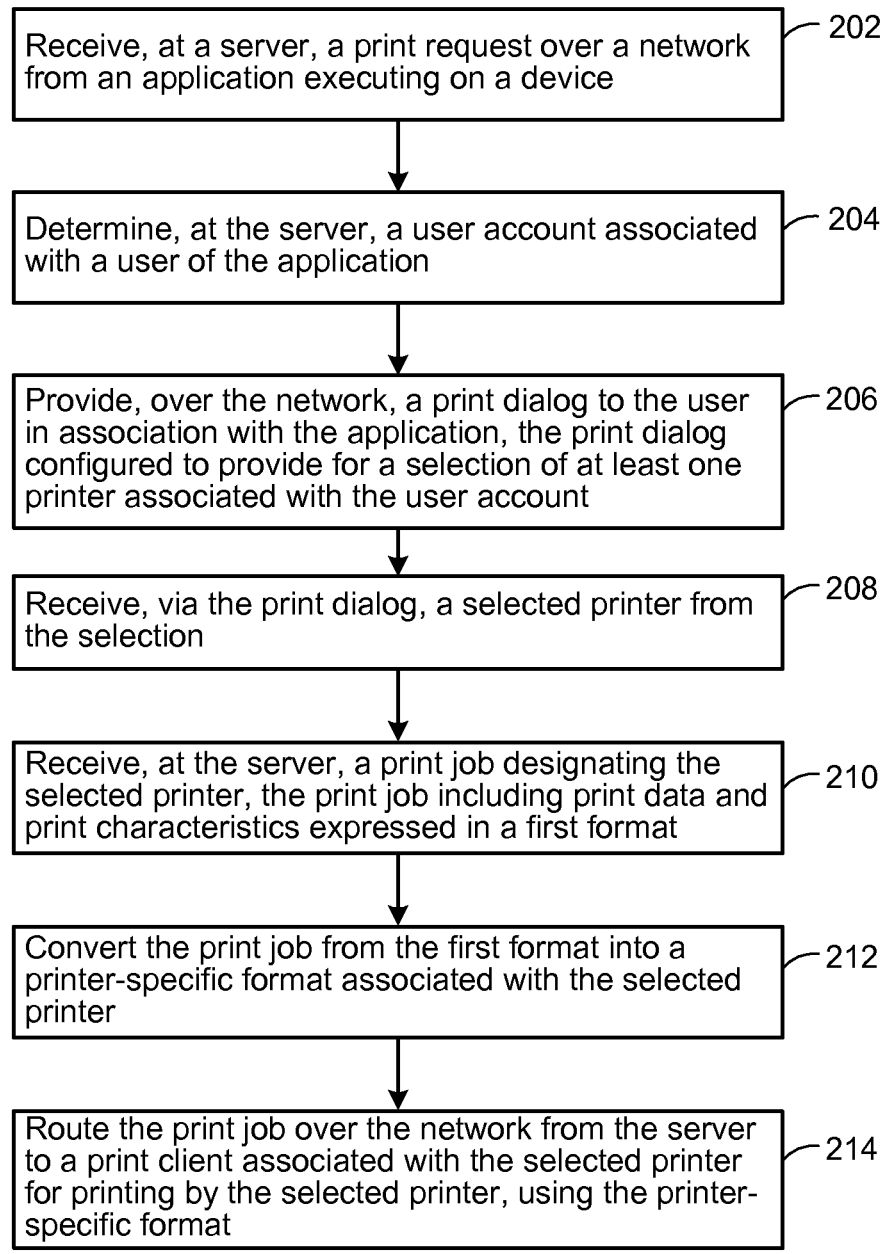
FIG. 2 is a flowchart illustrating example operations of the system of FIG. 1.

FIG. 2 is a flowchart 200 illustrating example operations 202-214 of the system of FIG. 1. Although the flowchart 200 of FIG. 2 illustrates the operations 202-214 in sequential order, it will be appreciated that this is merely an example, and that additional or alternative operations may be included. Further, operations of FIG. 2 and related operations may be executed in a different order than that shown, or in a parallel or overlapping fashion.

In the example of FIG. 2, a print request may be received at a server, over a network and from an application executing on a device (202). For example, as described above, the application manager 136 may receive a print request from a user of the application 112 executing on the device 108, or of the application 116 executing on the application server 114, or of the application 160 of the device 122. The print request may be received over the network 106 using an API that is common to the application 112/116/160 and the application manager 136.

A user account associated with a user of the application may be determined at the server (204). For example, the application manager 136 may conduct authentication of the user of the application in question, e.g., in conjunction with the registration manager 126. The authentication may occur prior to the print request, or in response thereto.

A print dialog may be provided over the network to the user in association with the application, the print dialog configured to provide for a selection of at least one printer associated with the user account (206). For example, the application manager 136 may determine that both of the printers 118, 120 are registered and associated with the user account of the user in question. Then, the application manager 136 may render the print dialog in conjunction with the application, and including a selection between the two printers 118, 120.

A selected printer from the selection may be received, via the print dialog (208). For example, the application manager 136 may receive a selection of either the cloud-aware printer 118 or the legacy printer 120.

A print job designating the selected printer may be received at the server, the print job including print data and print characteristics expressed in a first format (210). For example, the application manager 136 may receive the print job designating either of the printers 118, 120. The print job, as described, may include both the actual print data to be printed, as well as print characteristics specifying a manner in which the print data is to be printed, relative to printer capabilities of the selected printer(s). For example, such print characteristics may include a designation of one-sided versus two-sided printing, paper size, paper tray, color versus black-and-white, and various other such well-known print characteristics.

The print job, including the print data and such print characteristics, may be expressed in the first format as a printer-independent format. That is, the print job may be communicated to the application manager 136 by way of an appropriate API and in a manner which is generic or agnostic with respect to the selected printer, or to any printer. Consequently, the application in question need not have any knowledge of the printer to be used, even after the printer has been selected, in order to transmit the print job.

The print job may be converted from the first format into a printer-specific format associated with the selected printer (212). For example, the format converter 138 may be configured to convert the first (e.g., printer-independent) format into a printer-specific format for a selected one of the printers 118, 120. As may be appreciated, and as described herein, the term printer-specific in this context may include, e.g., reference to a specific type, category, or brand of printer, or to a uniquely-identified printer. The print job in the printer-specific format may include a full rasterization of the print job for use in printing by the selected printer (e.g., when the selected printer includes the cloud-aware printer), or may include a partial conversion so that final rasterization may occur later (e.g., at the print client (proxy) 156 and/or the print driver 158 of the device 122, as described herein).

The print job may be routed over the network from the server to a print client associated with the selected printer for printing by the selected printer, using the printer-specific format (214). For example, the print job router 142 may be configured to route the print job to the print client 146 of the cloud-aware printer 118, or to the print client(s) 156/162 of the legacy printer 120.

Figure 3A:
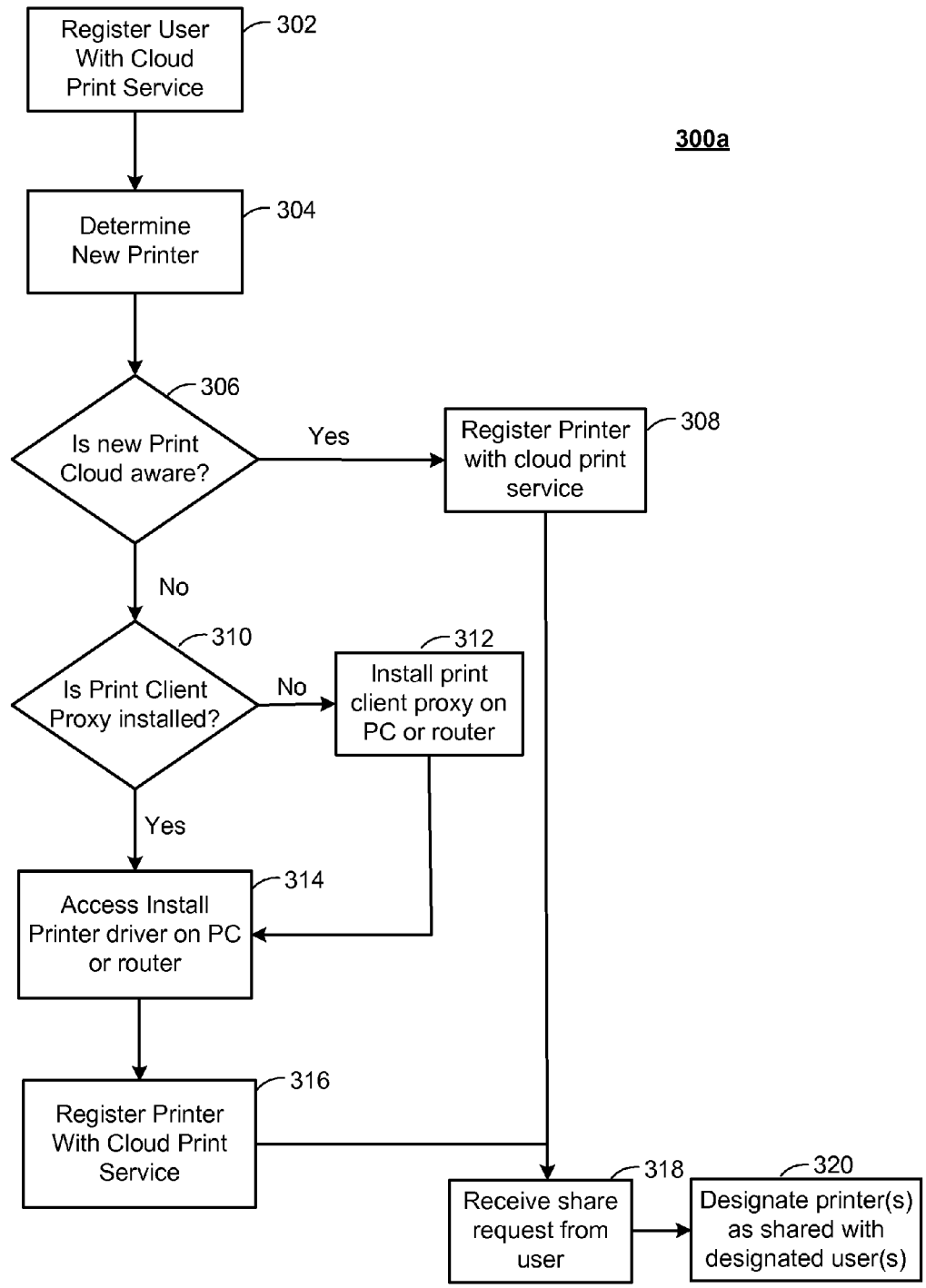
FIGS. 3A and 3B are flowcharts illustrating more detailed and/or specific more specific examples of the operation of system of FIG. 1.
Figure 3B:
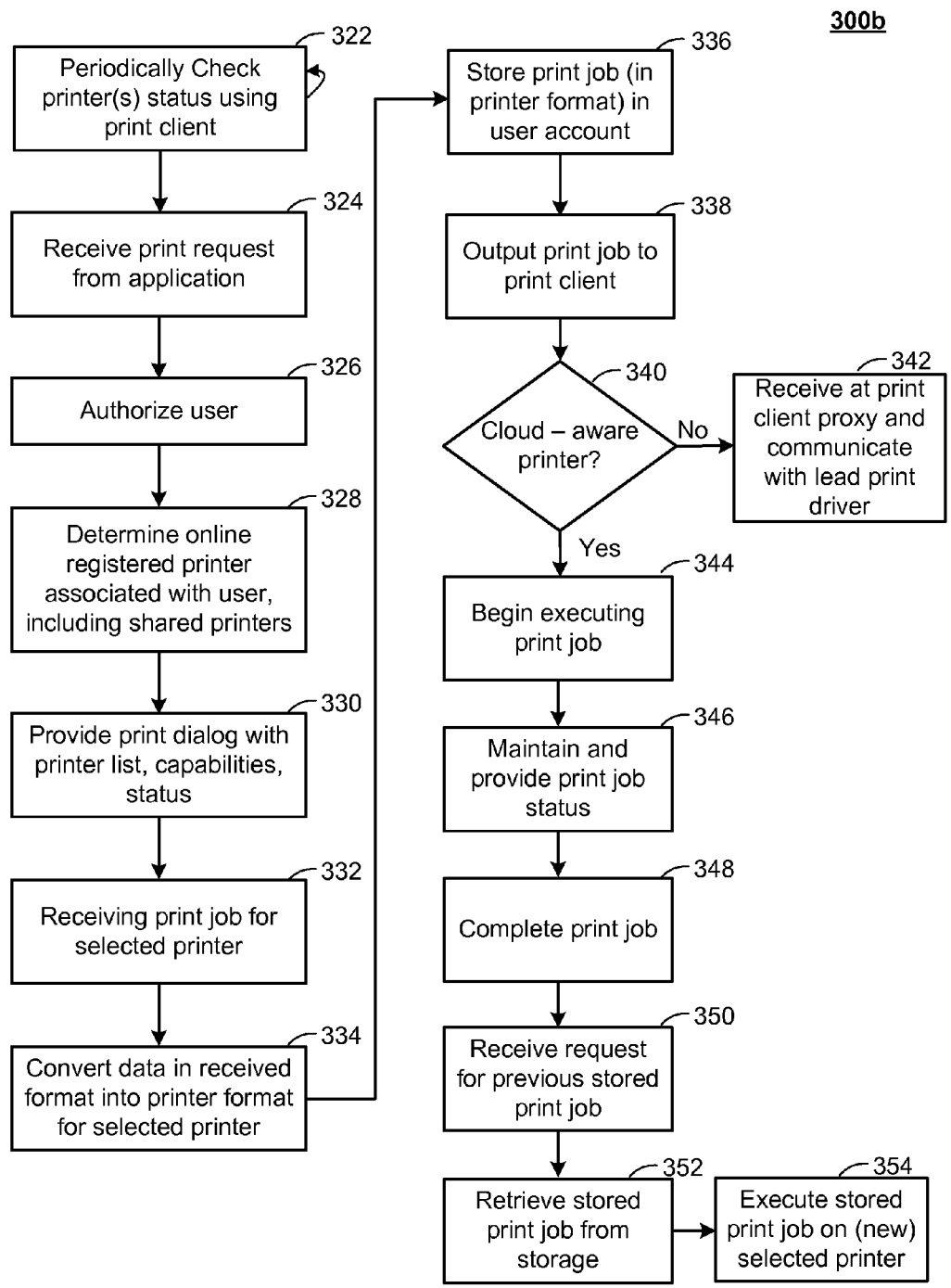

FIGS. 3A and 3B are flowcharts illustrating more detailed and/or specific more specific examples of the operation of system of FIG. 1. More specifically, FIG. 3A illustrates a first flowchart related to example scenarios for registering users and/or printers with the cloud print service 102, while FIG. 3B illustrates example operations for receiving and executing a print job from a registered user.

In FIG. 3A, a user may be registered with the cloud print service 102 (302). For example, as referenced above, a user wishing to use the cloud print service 102 may visit a web site thereof and establish a user account, e.g., by providing a username/password combination. In other scenarios, the user may visit the cloud print service website or a related website (e.g., an online email provider), and associate an existing user account of the related website with the cloud print service 102. The user account information may then be established and stored by (or accessed by) the user manager 132 and/or the registered users data store 134.

In FIG. 1, a single cloud print service 102 is illustrated. However, it may be appreciated that the network 106 may be used by multiple providers to provide multiple cloud print services. For example, a printer manufacturer may provide a cloud print service for its printers, while a $3^{rd}$ party provider for more general cloud computing may provide the cloud print service 102 as an auxiliary feature for its existing cloud-based computing platform, and therefore as a general service which is not specific to any particular type of printer.

Once a user account is established or available, a new printer may be determined (304), such as when a new printer is purchased and powered on, or when a given user gains access to a previously-inaccessible printer. For example, if the new printer is cloud-aware (306), the registration of the cloud-aware printer with the cloud print service 102 may proceed directly, such as described above (308). For example, as described, the user may login to the cloud print service 102 through an associated website or using the cloud-aware printer 118 itself, and registration information identifying the cloud-aware printer 118 may be entered by the user or received automatically by the cloud print service 102 over the network 106.

If the new printer is not cloud-aware, e.g., is a legacy printer such as the legacy printer 120, then it may be determined whether a print client is available on a device associated with the legacy printer 120 (310). If not, then it may be necessary to install such a print client proxy on an associated device (312), such as on the device 122 and/or associated router 124, as shown in FIG. 1. For example, the user may execute such an installation by visiting the website of the cloud print service 102, and following a link to download an appropriate print client 156/162.

If the legacy printer 120 requires an associated conventional print driver in addition to the print client 156/162, e.g., from a manufacturer of the legacy printer 120, then such software also may be downloaded or otherwise installed an the appropriate device (314), e.g., on the device 122 or the router 124.

Then, e.g., using the print client, the legacy printer 120 may be registered with the cloud print service 102. As with the cloud-aware printer, such registration may include providing of a unique identifier for the legacy printer 120, as well as other information which may be required by, or useful to, the cloud print service 102. For example, such registration information may include printer capabilities of the legacy printer 120, such as whether and how the legacy printer 120 provides color printing, two-sided printing, or other print features, and, further, details of the legacy printer 120 such as a number and location of paper trays, detailed information on how to report paper jams or other exceptions or malfunctions, and other information characterizing the legacy printer 120.

Again, such registration information may also be required by, or useful for, the cloud print service 102 with respect to the cloud-aware printer 118. However, in the case of the cloud-aware printer 118, it may occur that such registration information is provided automatically by the cloud-aware printer 118, or at least partially provided at an earlier stage, such as at a time of manufacture of the cloud-aware printer 118. In the latter case, for example, it may occur that a printer manufacturer provides the cloud print service 102 for all of its printers. In such a case, the printer manufacturer may know or may determine any needed registration information (e.g., printer capabilities) when initially manufacturing each printer for sale. Then, during an actual registration of a specific cloud-aware printer, it may only be necessary to transmit a minimal amount of information to identify the specific printer uniquely for association with one or more users.

In the above examples, it is assumed that the printer(s) to be registered are being registered with the account(s) of logged-in users who wish to access a new printer. As a further technique for registering printers, and as referenced above, it may occur that already-registered printers of a first user may be associated (shared) with an already-registered second user.

For example, a share request may be received from a user (318), identifying a registered printer to be shared and identifying one or more users to receive the share request. The share request may be provided, e.g., by email, to the identified user(s). Then, the registered printer(s) may be designated as shared with the designated users (320). That is, a receiving/second user may thereafter have some or all printing rights with respect to the shared printer.

In the example flowchart 300b of FIG. 3b, it is assumed that all relevant users and printers are registered with the cloud print service 102, and that a user, e.g., a user of the device 108 and/or 122, may wish to print to either the cloud-aware printer 118 or the legacy printer 120.

Initially, then, the cloud print service 102, e.g., the print job router 142, may be configured to periodically check a status of a printer(s), using a corresponding print client (322). For example, the print job router 142 may be aware that the cloud-aware printer 118 is available, as long as the cloud-aware printer 118 is powered on at a given time. On the other hand, checking a status of the legacy printer 120 may require that the router 124 and/or the device 122 is/are both powered (e.g., so that corresponding print client(s) 156/162 is/are available). In the present context, printer status may include a determination as to whether a given printer is available, or is currently experiencing an exception (e.g., paper jam), and/or a determination as to a current number of print jobs queued for the printer in question.

At some point in time, a print request may be received from an application (324). For example, a user of the device 108 may be using the application 112, e.g., by reading an email or other document, or by viewing an image within an image viewing application. Within the application, the user may select a print option, e.g., by using a generally conventional technique(s), such as selecting from within a drop-down menu, or selecting a printer icon displayed within the application. Such action may initiate or execute a communication between the application 112 and the application manager 136, so as to notify the application manager 136 that a print job may be forthcoming.

It may be necessary to authorize the user (326) as being allowed to proceed with printing. For example, the need may exist to ensure that the user in question has a user account established with the cloud print service 102.

User authorization techniques are generally well-known, and not discussed here in detail. In general, though, the application manager 136 may communicate with the user manager 132 to verify that the user has provided a valid username/password, or otherwise been authenticated. If the user does not have a valid user account, then a user account may be established. Of course, it may occur that user authorization occurs prior to receipt of a print request, as well.

For the authorized user, the application manager 136 may then communicate with the printer manager 128 to determine which registered printers from the registered printers 130 are associated with the user's account, including any printers shared with the user by another user (328). For example, the application manager 136 may determine that the user is associated with both the cloud-aware printer 118 and with the legacy printer 120. Based on the status checks referenced above by the print job router, it may be assumed that both printers 118, 120 have been determined to be available for printing.

As referenced herein, the user may be remote from the printers 118, 120, e.g., may be using a mobile device as the device 108, and may be walking, riding within a car, or otherwise in an environment not currently considered optimal or feasible for printing. Further, the user may be using the application 112, which may similarly represent an application not currently associated with optimal or feasible printing options (e.g., web applications, as referenced above).

Nonetheless, simply by selecting "print" and signing into the cloud print service 102, such a user may be presented with full printing options for all registered and available printers. For example, the cloud-aware printer 118 may represent a work printer, while the legacy printer 120 is a home printer of the user. In another example, and continuing the example above in which the device 108 represents a mobile device, e.g., a smartphone, it may occur that the user is talking to another user who owns the cloud-aware printer 118. The device user may use online capabilities of the device 108 to select and purchase tickets, e.g., tickets to a show, or airline tickets. Then, the device user may select the cloud-aware printer 118 of the other user to print the tickets, so that the two users may both meet later at a rendezvous point and may both have hard copies of the needed tickets.

Continuing the example operations of FIG. 3B in more detail, once the printers 118, 120 are determined as being associated with the user of the device 108, the application manager 136 may present the user with a print dialog including a list of the available printers 118, 120, and/or current information about capabilities or a status of each printer (330).

As referenced above, and as described in more detail below with respect to FIG. 4, the application manager 136 may provide such a print dialog either directly or indirectly. That is, in either case the application manager 136 may access a suitable API to interact with the application 112. In a first example, a suitable API may be used to actually render a print dialog within the application 112, where a presentation and other aspects of an appearance of such a print dialog may be determined exclusively by the application manager 136. In such cases, such print dialogs are thus provided by the cloud print service 102 and may therefore be consistent in appearance and content within and among various applications. For example, the cloud print service 102 may be included within, or operate in conjunction with, a suite of applications (e.g., email applications, image viewing applications, and any other cloud-based/web applications). Consequently, there may be value to a provider of such a suite of application to have the cloud print service 102 provide a uniform print dialog across multiple applications. Further, it may be easiest and most straight-forward for a developer of the application 112 to integrate and utilize the API(s) of the application manager by using a provided print dialog.

In other example implementations, however, an application developer may specifically wish to develop a specific print dialog to be associated with the application 112, which may be different from a default print dialog provided by the application manager 136. For example, such a choice may be a matter of preference as to an appearance or functionality of the print dialog. In other examples, and conversely to the examples above, it may occur that the application 112 is itself part of a suite of applications, and, further, that each application within such a suite may be compatible with multiple cloud print services. In such a case, the application developer may wish to provide a uniform print dialog across all of the application suite and cloud print services. Consequently, the application manager 136 may use a suitable API (or aspects thereof) to provide the application 112 with information necessary to render a print dialog, and the application itself may be responsible for an actual desired rendering.

However the print dialog is provided, it may subsequently occur that the user selects from the provided printer list, e.g., from the printers 118, 120, and then is provided with printer options associated with a selected printer. Upon selecting from these options, the user may then submit, and the application manager 136 may then receive, the print job from the selected printer (332), including the actual print data and the selected print characteristics. As referenced and described herein, the print job may be communicated to the application manager using a corresponding API, and in a format that is independent of the selected printer (e.g., in a format that would be the same for the same print job for either printer 118, 120, regardless of which printer 118, 120 was actually selected). In this way, the application 112 need not have any awareness or knowledge of the selected printer, other than allowing for the actual selection thereof by the user from within the print dialog.

At the cloud print service 102, the received print job may then be converted into a printer format for the selected printer (334). For example, the format converter 138 may be configured to convert the printer-independent format into a format associated with the cloud-aware printer 118 or the legacy printer 120, depending on a selection of the user.

The print job may then be stored in association with the user account of the user (336), e.g., within the job storage 140. The print job may be stored in either the printer-independent format as received from the application 112, or in the printer format associated with the selected printer. In either case, as referenced above, such persistent storage of the print job in association with the user account allows for later location and printing of the same print job at a later date, without having to re-generate the document to be printed (e.g., without having to visit a website at which a document was originally generated).

The print job may then be output to a corresponding print client (338). For example, the print job router 142 may output the converted print job to either of the printers 118, 120, or both, depending on which was selected earlier. If the selected printer does not include a cloud-aware printer (340), e.g., includes a legacy printer, then the print job may be received at the local print client and communicated to the local print driver (e.g., may be received at the print client(s) 156/162 and communicated to the print driver 158).

It may be appreciated that the burden of converting the print job from the printer-independent format received from the application 112 for actual printing at one of the printers 118, 120, may be shared to varying extents between the format converter 138 and the various print clients 146, 156, 162. For example, in one example using the cloud aware printer 118, the format converter 138 may provide essentially the entire process of determining printer commands for the cloud-aware printer 118. In this case, the print client 146 may be used to receive the print job for forwarding to appropriate printer hardware (e.g., processor(s) driving the associated ink dispensers). In such a case, the cloud-aware printer 118 may be very inexpensive to manufacture, with minimal hardware/software requirements.

In other scenarios, the format converter 138 may execute a partial format conversion, and the print clients 146, 156, 162 may be more involved in calculating or otherwise determining actual, low-level printer commands. Such a practice may be suitable, for example, where a manufacturer of the printer in question has certain specific needs or requirements which are not readily compatible with the cloud print service 102, or, in other cases, where the printer in question already has the processing capabilities to be responsible for a certain amount of the conversion process. In the latter case, although such printers may be relatively more expensive due to supporting the associated hardware and software requirements associated with the conversion(s), it may make sense simply to leverage such existing resources if they do already exist, rather than support them independently at the cloud print service 102. In particular, the legacy printer 120 may already have a relatively large amount of hardware/software resources, including the print driver 158, so that it may make sense to perform a relatively small proportion of the format conversion process at the format converter 138, while allowing the print client 156/162 and the print driver 158 to finalize and execute a final print job.

In either case, the print job may proceed with execution (344), during which the print job router 142, having provided the print job, may continue to maintain the print job status for provision to the application 112, as needed (346). For example, after execution of the print job begins, a paper jam may occur at the legacy printer 120. Then, the print job router 142 may become aware of the paper jam through the print client 152, and may thereafter output a notification to the application 112, perhaps using the print dialog of the application manager 136.

Assuming any such exceptions may be resolved, the print job may be completed (348). At a later time, as referenced above, a request may be received for a previous, stored print job (350). For example, a user of the application 112 may select "print," and the resulting print dialog may include an option to select previous print jobs, whereupon such previous print jobs may be retrieved from the job storage 140 (352). For example, the user may be provided the options of identifying previous print jobs by search terms, dates of printing, or other selection criteria. Then, the user may execute a selected, previous print job, and, moreover, may execute such a print job using any registered printer associated with the user (354).

Figure 4:
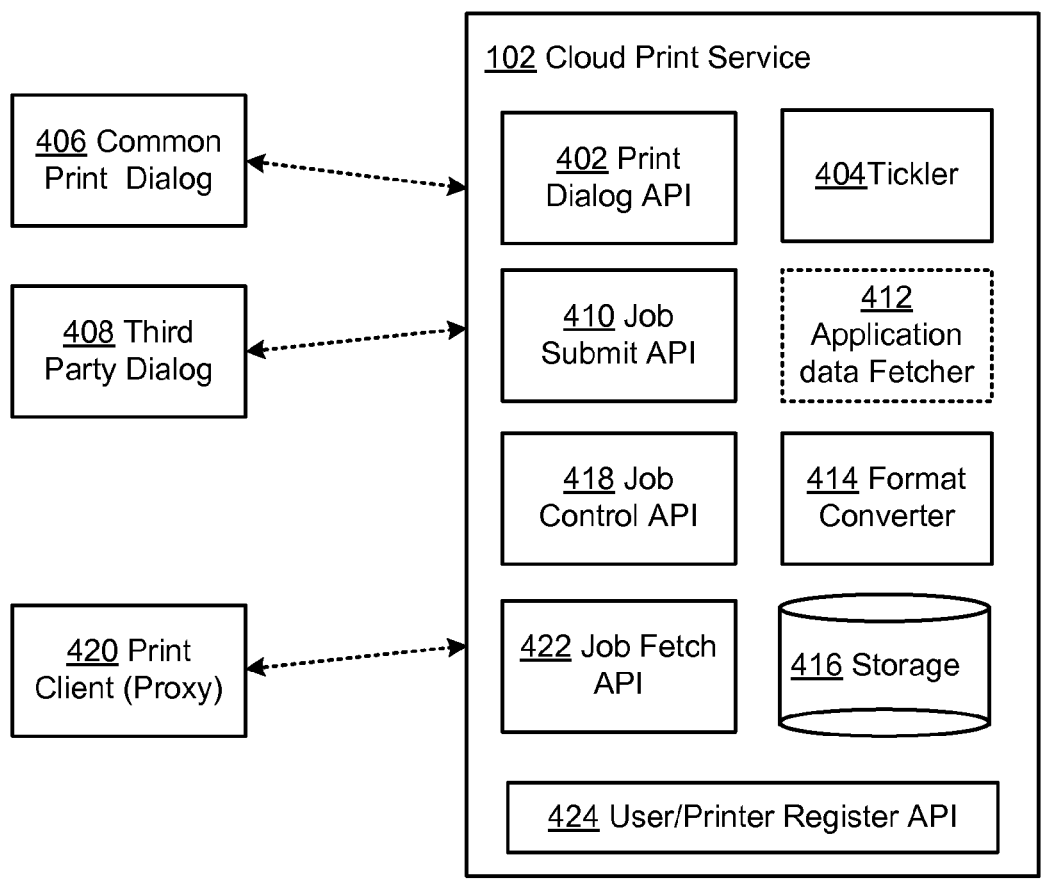
FIG. 4 is a block diagram of a more detailed example of an implementation of a cloud print service of FIG. 1.

FIG. 4 is a block diagram of a more detailed example of an implementation of the cloud print service 102 of FIG. 1. More specifically, FIG. 4 illustrates specific APIs that may be used by the various components of the cloud print service 102. As such, it may be appreciated that such APIs may individually be included in one or more of the various components of the cloud print service 102 illustrated in FIG. 1, as would be apparent.

In the example of FIG. 4, the cloud print service 102 is illustrated as including a print dialog API 402, which is in communication with a tickler 404. The tickler 404 may be operable to send notification(s) of new print jobs available for a given printer(s).

Then, upon authorization of a user by the print dialog API 402, a list of printers, associated printer capabilities, and current jobs per printer and other status information may be provided to the application user, e.g., by way of a common print dialog 406, which may be rendered, e.g., using Javascript. As already explained, such a print dialog 406 may, in appearance, resemble conventional print dialogs, except as otherwise set forth herein (e.g., may allow for selection of an available printer and associated print features). In an example of a non-conventional aspect of the common print dialog 406, the common print dialog 406 may include a field(s) to allow a user to search and identify a previous/stored print job that is persistently stored by the cloud print service 102.

The print dialog API 402 may thus provide (e.g., render) the common print dialog 406 essentially in its entirety for the application user, and thereby provide a common print dialog experience across applications interfacing with the cloud print service 102. As also described, the print dialog API also may simply provide sufficient information for an application developer to construct a third party dialog 408, which may be different in appearance than the common print dialog 406, e.g., may have a proprietary appearance associated with a suite of applications provided by the developer/provider thereof.

Assuming authorization of the user proceeds, the user may then provide printer selection(s) and associated desired print characteristics, as well as the actual print data. The print data may be expressed in any conventional format, e.g., HTML, PDF, XPS, or an image format such as JPG, to name a few.

The print job may then be received at a job submit API 410, e.g., from either dialog 406, 408. In some implementations, the print data may be included by reference to remote print data, e.g., by identification of an appropriate URL. Then, an application data fetcher 412 may be used to retrieve data to be printed.

The job submit API 410 may receive the print job in, to give a specific and non-limiting example(s), a hyper-text transfer protocol (HTTP) multi-part request which may include the printer capabilities expressed, e.g., in XPS, as well as a MIME type identifying the content type. The job submit API may then provide the print job, including the print data and print characteristics, to a format converter 414. The format converter 414 operates essentially as described herein with respect to the format converter 138 of FIG. 1, and stores the print job within storage 416.

A print client 420, which may represent any of the print clients 146, 156, 162 of FIG. 1, communicates with a job control API 418 and a job fetch API 422, to execute the print job. Specifically, the job fetch API 422 may provide the print job to the print client 420, e.g., may be used by the print client 420 to fetch the next available job for the specified printer.

The job control API 418 may be responsible for authorizing the print client 420 as needed, and for receiving updated status information from the printer in question, such as whether the print job has completed or failed. Such status information may also be stored within the storage 416 in associated with a corresponding print job. The job control API may include status information including, e.g., whether a print job is currently queued and not yet downloaded to a corresponding print client 420, or spooled/downloaded and added to the client side native printer queue (if applicable).

In further examples of the print client as the print client proxy 156, it may occur that the proxy fetches print jobs in PDF format, along with the user-selected print characteristics represented as XML. Then, the proxy may use a PDF interpreted library to rasterize and print the PDF.

Finally in FIG. 4, a user/printer register API 424 is illustrated which is responsible for communicating with the print client 420 to register the user(s) and all associated printers. Such registration information may be communicated using a HTTP multi-part request, and may include identification of the printer along with the printer capabilities (e.g., expressed in XPS), and may be stored in the storage 416 with the various print jobs. Further, as referenced above with respect to FIG. 3A, such registration processes and information may occur previously to actual print job executions, or interspersed therewith. In the latter case, for example, the user may seek to execute a print job only to find that all available printers are currently occupied, jammed, or offline. Nonetheless, it would be a simple matter for the user then to register a new printer with the cloud print service 102 and proceed accordingly with the newly-registered printer to execute the desired print job.

Many other examples and variations of the systems and operations of FIGS. 1 to 4 would be apparent to one skilled in the art. For example, instead of printing to a hardware printer, the system(s) 100/400 or similar systems may be used to print to PDF or other software format.

Figure 5:
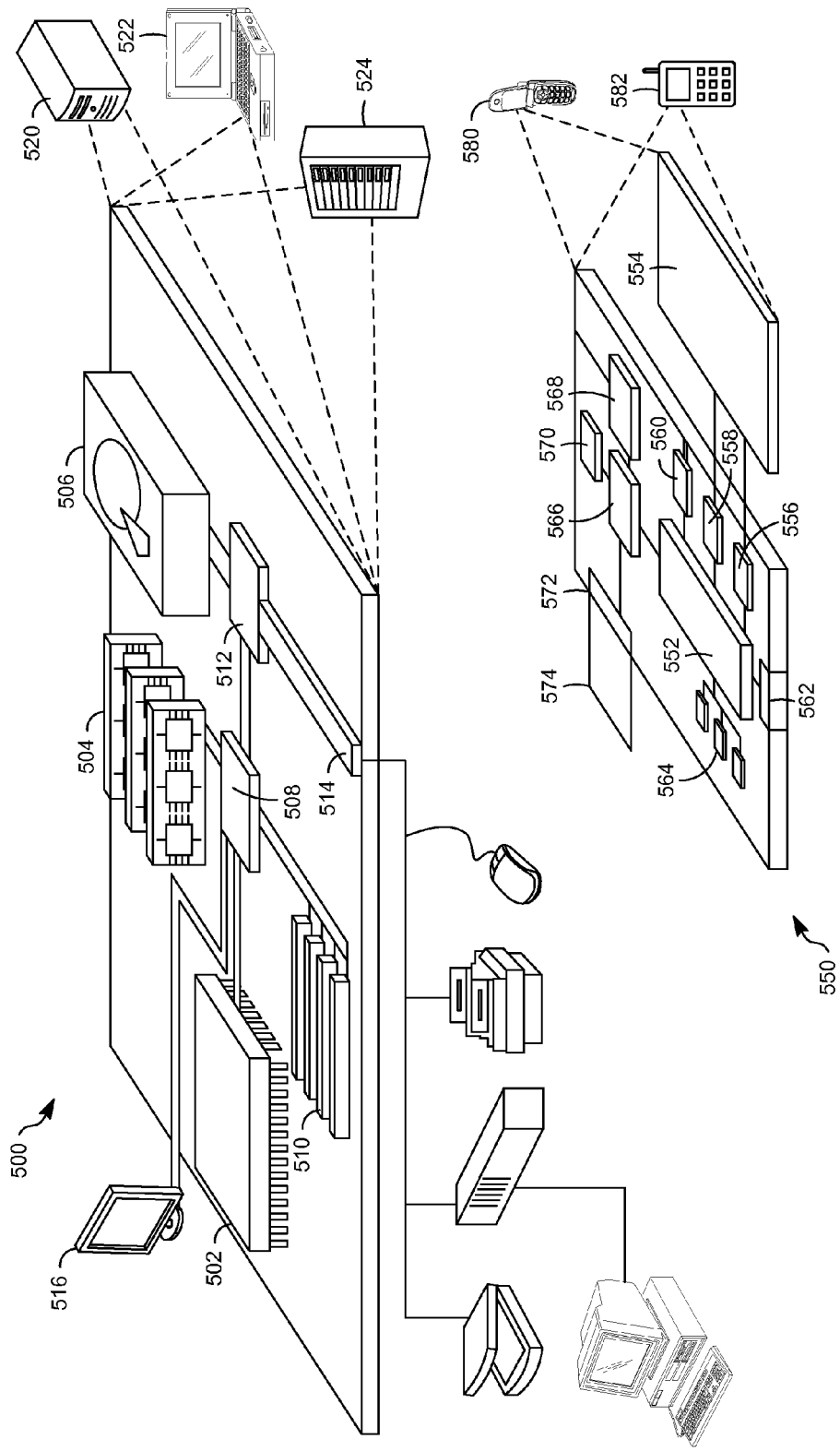
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A print server comprising:
   at least one processor;
   a non-transitory computer readable medium including instructions executable by the at least one processor, the instructions configured to implement a cloud print service, the cloud print service including:
   an application manager configured to receive a print request over a network from an application executing on a device, and configured to provide, over the network, a print dialog to a user of the application, the print dialog configured to provide for a selection of at least one cloud-enabled printer associated with a user account of the user and thereafter receive a selected cloud-enabled printer from the selection, each cloud-enabled printer being configured to support communication with the cloud print service;
   a format converter configured to receive a print job designating the selected cloud-enabled printer, the print job including print data and print characteristics expressed in a printer-independent format, and configured to convert the print job from the printer-independent format into a printer-specific format associated with the selected cloud-enabled printer, wherein the format converter configured to convert the print job from the printer-independent format into the printer-specific format includes determining at least one printer command associated with the selected cloud-enabled printer for use by the selected cloud-enabled printer in executing the converted print job; and
   a print job router configured to route the converted print job over the network from the cloud print service to a print client associated with the selected cloud-enabled printer, for printing by the selected cloud-enabled printer, using the printer-specific format and the at least one printer command.

2. The print server of claim 1, comprising a registration manager configured to determine the user account and associated selection of at least one cloud-enabled printer from among a plurality of user accounts and cloud-enabled printers registered with the cloud print service.

3. The print server of claim 1, wherein the application manager is configured to authenticate the user relative to the user account, in response to receiving the print request.

4. The print server of claim 1, wherein the application manager is configured to provide the print dialog including providing, via an application program interface (API), information to the application with which to render the print dialog in association with the application.

5. The print server of claim 1, wherein the application manager is configured to communicate with the print client to determine a current status of the selected cloud-enabled printer.

6. The print server of claim 1, wherein a registration manager of the cloud print service is configured to communicate with the print client to execute a printer registration of the selected cloud-enabled printer, including determining printer capabilities of the selected cloud-enabled printer for executing the print job, relative to the print characteristics.

7. The print server of claim 1, wherein the print client is installed on the selected cloud-enabled printer, and the selected cloud-enabled printer is a network-aware printer.

8. The print server of claim 1, wherein the print client is configured to execute within a browser application.

9. The print server of claim 1, wherein the print client is installed on a printer device that is locally connected to the selected cloud-enabled printer.

10. The print server of claim 1, wherein the print client is installed on a router that is locally connected to the selected cloud-enabled printer.

11. The print server of claim 1, wherein the format converter is configured to convert the print job from the printer-independent format into the printer-specific format including executing a rasterization of the print job for use by the selected cloud-enabled printer in executing the print job.

12. The print server of claim 1, wherein the format converter is configured to convert the print job from the printer-independent format into the printer-specific format including providing the print job in the printer-specific format to the print client, for subsequent execution of a rasterization of the print job for use by the selected cloud-enabled printer in executing the print job.

13. The print server of claim 1, wherein the print server is configured to store the print job in association with the user account.

14. A computer-implemented method, comprising:
  receiving, at a server implementing a cloud print service, a print request over a network from an application executing on a device;
  determining, at the server, a user account associated with a user of the application;
  providing, over the network, a print dialog to the user in association with the application, the print dialog configured to provide for a selection of at least one cloud-enabled printer associated with the user account, each cloud-enabled printer being configured to support communication with the cloud print service;
  receiving, via the print dialog, a selected cloud-enabled printer from the selection;
  receiving, at the server, a print job designating the selected cloud-enabled printer, the print job including print data and print characteristics expressed in a printer-independent format;
  converting the print job from the printer-independent format into a printer-specific format associated with the selected cloud-enabled printer, wherein the converting includes determining at least one printer command associated with the selected cloud-enabled printer for use by the selected cloud-enabled printer in executing the converted print job; and
  routing the converted print job over the network from the server to a print client associated with the selected cloud-enabled printer for printing by the selected cloud-enabled printer, using the printer-specific format and the at least one printer command.

15. The method of claim 14, wherein the print client is installed on the selected cloud-enabled printer, and the selected cloud-enabled printer is a network-aware printer.

16. The method of claim 14, wherein the print client is installed on a printer device that is locally connected to the selected cloud-enabled printer.

17. A computer program product, the computer program product including a cloud print service that is tangibly embodied on a non-transitory computer-readable medium and includes executable code that, when executed, is configured to cause a data processing apparatus to:
  receive, at the cloud print service, a print request over a network from an application executing on a device;
  provide, over the network, a print dialog association with the application, the print dialog configured to provide for a selection of at least one cloud-enabled printer, each cloud-enabled printer being configured to support communication with the cloud print service;
  receive, via the print dialog, a selected cloud-enabled printer from the selection;
  receive, at the cloud print service, a print job designating the selected cloud-enabled printer, the print job including print data and print characteristics expressed in a printer-independent format;
  convert, using the cloud print service, the print job from the printer-independent format into a printer-specific format associated with the selected cloud-enabled printer, wherein the convert the print job includes determine at least one printer command associated with the selected cloud-enabled printer for use by the selected cloud-enabled printer in executing the converted print job; and
  route the print job over the network from the cloud print service to a print client associated with the selected cloud-enabled printer for printing by the selected cloud-enabled printer, using the printer-specific format and the at least one printer command.

18. The computer program product of claim 17, wherein the cloud print service is configured to:
  register a plurality of users in association with a plurality of user accounts;
  register a plurality of cloud-enabled printers to receive print jobs, and
  associate user accounts with at least one registered cloud-enabled printer of the registered cloud-enabled printers.

19. The computer program product of claim 18, wherein the cloud print service is configured to:
  receive a request from a first registered user to share a registered cloud-enabled printer of the first registered user's user account with a second registered user; and
  associate the registered cloud-enabled printer with a user account of the second registered user.

20. The computer program product of claim 17, wherein the print client is installed on the selected cloud-enabled printer, and the selected cloud-enabled printer is a network-aware printer.

21. The computer program product of claim 17, wherein the print client is installed on a printer device that is locally connected to the selected cloud-enabled printer.

22. A cloud-aware printer, comprising:
  a network access manager configured to execute communications over a network between the cloud-aware printer and a cloud print service being executed on a cloud print server; and
  a print client configured to execute a print job originating from an application executing on a device that is on the network, the print job being received from the cloud print service via the network access manager, the print job including print data and print characteristics expressed in printer-specific format corresponding to the cloud-aware printer.

23. The cloud-aware printer of claim 22, wherein the print client is configured to provide registration information for the cloud-aware printer for registration thereof with the cloud print service.

24. The cloud-aware printer of claim 23, wherein the cloud-aware printer provides the registration information including printing at least a portion of the registration information, including a website associated with the cloud print service.

25. The cloud-aware printer of claim 23, wherein the cloud-aware printer provides the registration information including displaying at least a portion of the registration information on a display of the cloud-aware printer.

26. The cloud-aware printer of claim 23, wherein the cloud-aware printer provides the registration information including transmitting at least a portion of the registration information using the network access manager.

27. The cloud-aware printer of claim 23, wherein the cloud-aware printer is configured to receive user registration information for association thereof with the registration information within the cloud print service.

\* \* \* \* \*